INVENTOR.
LAEL B. TAPLIN

BY Richard J. Seeger
ATTORNEY

United States Patent Office 3,373,600
Patented Mar. 19, 1968

3,373,600
METHOD FOR DETERMINING FLUID CHARACTERISTICS UTILIZING FLUID STREAM OSCILLATING DEVICES
Lael B. Taplin, Livonia, Mich., assignor to The Bendix Corporation, a corporation of Delaware
Continuation of application Ser. No. 346,131, Feb. 20, 1964. This application Oct. 13, 1966, Ser. No. 596,365
3 Claims. (Cl. 73—32)

ABSTRACT OF THE DISCLOSURE

A method for determining the characteristics, such as density, quality, enthalpy, and bulk modulus of a fluid, the principal components of which are known, in which the fluid is passed through a fluid oscillator and the frequency of oscillation is measured. The average pressure of the fluid at a predetermined location in the oscillator is also measured. These two measurements are then usable, along with the calibration constant of the oscillator and other known constants, in well known formulas to obtain the desired characteristics.

---

Figures 1, 2:
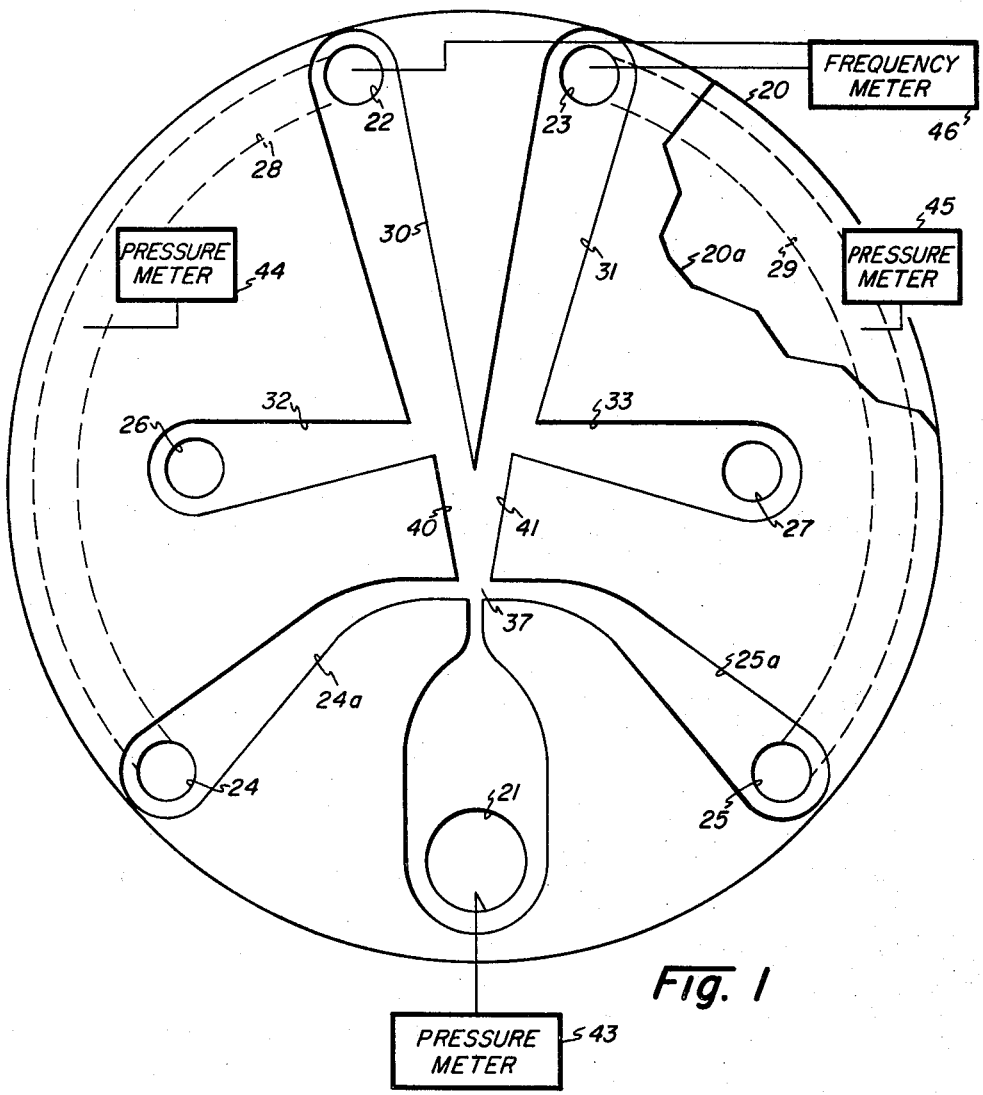

This is a continuation of my copending application Ser. No. 346,131 now abandoned, filed Feb. 20, 1964, entitled "New Uses of Fluid Stream Oscillating Devices." This invention pertains to new uses of fluid stream control devices of the kind where a fluid stream has its output flow varied in a periodic manner by secondary flows which derive from the fluid stream. The control devices include those which divert the fluid stream from one channel to another channel by means of a feedback pressure transversely applied to the stream. The new uses include a densimeter (or specific volume meter), a ratio detector, which is a device for determining the percentage of two gases with different masses and more specifically a quality meter for measuring the percentage of two gases with different masses and more specifically a quality meter for measuring the percentage of water and steam in water vapor, an enthalpy meter, total heat meter, and bulk modulus meter.

The fluid stream control devices utilized by the invention are known to the arts. The specific embodiment described and illustrated below is the type having a common fluid source flowing into two channels with means to switch the stream from one channel to the other channel and then back to the one channel and has been used as a flip-flop switch, fluid amplifier and oscillator. Other known fluid oscillator types may also be used with this invention.

This invetnion measures the frequency of cyclic variation of the fluid device and can determine the density or temperature of the fluid stream. With reference to vapor tables, the quality of the fluid becomes known and bulk modulus, enthalpy and other measurements can be made almost instantaneously and therefore this invention provides a significant advance over meters of the prior art.

These and other objects and advantages will become more apparent when a preferred embodiment of this invention is described in connection with the drawings in which:

FIGURE 1 shows a plan view of one fluid control device of this invention and meters which are connected to the control device for providing information to determine the density or quality of the fluid flowing in the control device; and FIGURE 2 shows a plot of quality vs. frequency squared when a device of this invention is used as a quality meter.

In the drawing is shown base 20 having inlet port 21, outlet ports 22, 23, feedback ports 24, 25 and vent ports 26, 27 formed therethrough. Connecting inlet port 21 and outlet port 22 is passage 30 and connecting inlet port 21 and outlet port 23 is passage 31. Vent ports 26, 27, which are exhausted to atmosphere or connected to vent tanks, not shown, are connected respectively to passages 30, 31 by vent passages 32, 33. Outlet ports 22, 23 are connected respectively to feedback ports 24, 25 by delay lines 28, 29 and feedback ports 24, 25 communicate through passages 24a, 25a respectively with the main fluid stream flowing from inlet port 21 at junction 37 where the fluid stream is urged against attachment walls 40, 41. Static pressure meters 44, 45 are placed respectively in delay lines 28, 29, or one pressure meter may be placed in port 21. A frequency meter 46, for detecting the frequency of fluid stream oscillation between passages 30, 31 is connected to ports 22, 23. The frequency meter 46 may be of the following kinds: standard pressure pickups suitable for the temperatures used; a mircophone; vibration pickup affixed to oscillator; or strain gauge wire wrapped about delay lines and used in a suitable electronic bridge circuit.

Passages 24a, 25a, 30, 31, 32 and 33 are defined by grooves in base 20. The entire surface of base 20 wherein said grooves are formed is covered by a plastic cover 20a. Passages 28, 29 are formed by covered grooves in the opposite side of base 20.

In the operation of this device, vapor is supplied to inlet port 21 by means not shown and the vapor fluid stream then enters either of passages 30 or 31. If the stream enters passage 31, it produces a pressure wave through outlet port 23 and also to delay line 29 where after a predetermined time, the time necessary for the pressure wave to travel the length of delay line 29, which length together with the length of passage 25a, may be referred to as L, it enters feedback port 25 and passage 25a and causes a force to be applied to the stream at junction 37, moving the stream from passage 31 to passage 30. When the stream is in passage 30, it produces a pressure wave through outlet port 22 and said wave propagates through delay line 28. After the pressure wave which flows through delay line 28 has traversed the length of delay line 28 plus the length of passage 24a (also length L), it exerts a force on the stream passing to passage 30 at junction 37 to move the stream from passage 30 to passage 31.

This fluid stream movement is repeated with a frequency that depends upon the length L of the passage through lines 28 and 24a which in this embodiment is equal to the passage and the characteristics of the stream through lines 29 and 25a.

Because of the atatchment walls 40, 41, the fluid stream is held respectively with a predetermined force so that the force of the flow from passages 24a and 25a must reach a minimum force before the stream is separated from walls 40 or 41 respectively. When such a force has been accumulated, it will be sufficient to quickly and completely move the stream from walls 40 or 41 or vice versa.

The reason the stream is held against wall 40 or wall 41 is as follows: Assume the stream to be flowing in passage 31. The stream velocity will cause air to be drawn from port 25, reducing the pressure in port 25 and along wall 41, thus tending to hold the stream against wall 41 as more pressure exists on the free side of the stream. Therefore the pressure pulse sufficient to remove the fluid stream from either walls 40 or 41 will be more than adequate to move it completely and quickly to the opposite wall giving reliable switching or oscillator action. Further, once the fluid stream has been switched to either passage 30 or 31, it will stay in that passage and will not be moved by any pulse that is less than the predetermined minimum pulse which is required to move it. Also, if no pulse at all appears from passages 24, 25, the fluid stream will remain where it is and will not "wander" between walls 40, 41.

NEW USES OF FLUID CONTROL DEVICE

I. Densimeter

The frequency of oscillation of the fluid stream is influenced by the time, T, required for a fluid pulse to travel from port 23 to junction 37. It is primarily this time that is between switching of the fluid stream from one passage 30 to 31 to the other except for small transit delays in the jet device itself. This time may be expressed as follows:

$$T = \frac{L}{\overline{V}} \quad (1)$$

where:

$L$=length of the passage along line 28 plus line 24a
$\overline{V}$=velocity of pressure wave in the fluid stream.

Further, $\overline{V}$, the velocity, may be expressed as follows:

$$\overline{V} = \sqrt{kP_o v g} \quad (2)$$

where:

$k$=specific heat ratio of the vaporized fluid flowing in the meter
$P_o$=average pressure in delay line
$v$=specific volume
$g$=acceleration of gravity hence, the total time taken to traverse both delay lines would be as follows:

$$T_T = \frac{2L}{\sqrt{kP_o v g}} \quad (3)$$

and the frequency is $$f = \frac{1}{T_T} = \frac{1}{2L}\sqrt{kP_o v g} \quad (4)$$

where:

$T_T$=period of full cycle of oscillation in seconds
$f$=frequency of oscillation, c.p.s.
$k$=specific heat ratio of the vaporized fluid flowing in the meter
$P_o$=average pressure in delay line
$v$=specific volume
$g$=acceleration of gravity.

However, we are interested in the specific volume $v$ and solving Equation 4 for $v$ we get, $$v = \frac{4f^2 L^2}{kP_o g} \quad (4a)$$

$k$ in this formula is relatively constant for all values of density or specific volume ($v$). If measurements are required wherein the exact value of $k$ must be known, this can be determined and the result can accordingly be corrected.

The pressure $P_o$ can be obtained by placing pressure meters 44, 45 in the delay lines directly or, the pressure in port 21 or outlets 22, 23 can be measured. With curves calibrated for a given meter, the pressure in delay lines 28, 29 can be determined since there is a fixed relationship between the inlet 21 pressure or the outlets 22, 23 pressure and the pressure in delay lines 28, 29. Further, the delay lines 28, 29 are preferably designed so that they have ambient pressure therein. This may be obtained by making all the passages in the delay lines of a sufficiently large diameter so that there are no pressure drops due to restrictions.

As mentioned, L is the length of passage through lines 28 and 24a which in this embodiment is equal to the passage length through lines 29 and 25a and $f$ is the frequency that we measure with meter 46. The specific volume is now determined and the reciprocal of specific volume is density.

II. Quality meter

This invention also provides use as a ratio detector. For example, for determining the quality of the fluid stream, the same basic formula (4a) is used but in addition, the specific volume ($v$) once found is then located on standard vapor tables, which may be found in Thermodynamic Properties of Steam by Keenan & Keyes published by John Wiley & Sons, Inc., for the measured pressure at port 21 (read on meter 43) and the quality for that pressure may be read from the tables. A calibration curve of quality versus frequency from frequency meter 46 is made shown in FIGURE 2, for various pressures.

Each instrument made according to this invention may be calibrated, as in FIGURE 2, with frequency spaced along one axis of a graph and quality along the other axis of the graph with the parameter being pressure in the delay lines or upstream measured at port 21. Therefore, for a given pressure at inlet 21 the proper curve is selected and then once knowing the frequency, the quality can be immediately determined. This is superior to other type quality meters in the art which take a specific amount of time before the quality can be determined. Further, this is a simple, relatively inexpensive, and durable meter. Other types of ratio detectors are obtained by going to the appropriate table and calibrating if desired.

III. Enthalpy meter

In a similar maner, once the specific volume is found, for a given pressure at port 21, the enthalpy may be read directly from the vapor tables. Enthalpy may be plotted vs. frequency for various port 21 pressures to furnish a convenient table for ready determination of enthalpy.

IV. Bulk modulus meter

Bulk modulus may be determined for compressible fluids. At frequencies about 10 c.p.s. or higher the following is true:

$$B = kP_o \quad (5)$$

where:

$B$=adiabatic bulk modulus
$k$=specific heat ratio of the fluid
$P_o$=average pressure in delay line.

Substituting (5) in Equation 4 above, the following is obtained:

$$f = \frac{1}{2L}\sqrt{Bvg} \quad (6)$$

from which the Bulk Modulus B may be obtained when $v$ is known.

V. Temperature sensor

For perfect gases, $$RT_1 = P_o v \quad (7)$$

where:

$R$=the gas constant, which is the difference between the specific heats of the gas $C_P$ and $C_v$
$T_1$=absolute temperature of the gas
$v$=specific volume
$P_o$=average pressure in delay line.

Substituting (7) in Equation 4 above, the following is obtained:

$$f = \frac{1}{2L}\sqrt{RT_1 kg} \quad (8)$$

from which $T_1$ may be determined if R is known.

The frequency of the oscillating pressure in the fluid device is measured and used as the frequency in the above methods illustrated for the embodiment of FIGURE 1.

In general, fluid oscillators may be used with the principles of this invention by substituting in the above formulas for the quantity 2L a quantity C, which is a calibration constant. Each of the fluid oscillators to be used with this invention can be calibrated with a known fluid at a known frequency of oscillation and, where required, a known average fluid pressure or a known temperature. Then, the constant C may be determined by substitution in any of the above formulas and once determined, may be used from that time on for that oscillator for the determination of the quantities and properties of the fluid as indicated in the above teaching.

In those instances where average pressure is measured for use in the above formulas, such pressure may be measured in the main fluid stream between input port and output port, the input port, the feedback or volume chambers, or output port. As mentioned, the average pressure in the measured place is utilized. Once a given location for the pressure measurements is chosen, then the instrument should be calibrated for this location and the measurement should be made at the location chosen. If the location is changed, then the instrument should be re-calibrated for the new location. Hence, the value C will be different for different areas of pressure measurement.

Although this invention has been disclosed and illustrated with reference to particular applications, the principles involved are susceptible of numerous other applications which will become more apparent to persons skilled in the art. The invention is, therefore, to be limited only as indicated by the scope of the appended claims.

Having thus described my invention, I claim:

1. In the method for determining the characteristics such as density, quality, enthalpy and bulk modulus of a fluid, the principal components of which are known, using a fluid oscillator through which said fluid is passed to obtain oscillation of said fluid at a frequency following the relationship, $$f = C\sqrt{kPvg}$$

where
$f$ = frequency of oscillation of the fluid
$C$ = the calibration constant of the oscillator
$k$ = the specific heat ratio of the fluid
$P$ = the average pressure of fluid at a predetermined location corresponding to said calibration constant of said oscillator
$v$ = specific volume of the fluid
$g$ = gravitational acceleration the steps of:

(a) measuring the frequency of said oscillation; and
(b) measuring the average pressure at said predetermined location corresponding to said calibration constant of said oscillator thereby obtaining two measurements which are indicative of said characteristics.

2. The method of claim 1 wherein said fluid oscillator is of the type having an inlet passage joined to two outlet passages which receive fluid from said inlet passage and two feedback passages each connecting one of said outlet passages with said inlet passage in a manner such that the flow therefrom into said inlet passage tends to divert said stream to the other of said outlet passages, and wherein the frequency of oscillation determined is the frequency at which said fluid oscillates between said outlet passages.

3. The method of claim 2 in which said predetermined location is one of said feedback passages.

References Cited
UNITED STATES PATENTS

| | | | |
|---|---|---|---|
| 3,024,805 | 3/1962 | Horton | 137—597 |
| 3,093,306 | 6/1963 | Warren | 235—61 |
| 3,158,166 | 11/1964 | Warren | 137—81.5 |
| 3,273,377 | 8/1966 | Testerman | 73—30 |

RICHARD C. QUEISSER, *Primary Examiner.*

JAMES J. GILL, *Examiner.*

J. D. SCHNEIDER, *Assistant Examiner.*